United States Patent [19]

Dirck

[11] 4,456,279
[45] Jun. 26, 1984

[54] MULTIPLE CONNECTION TRAILER HITCH

[76] Inventor: Benny L. Dirck, P.O. Box 91, Inola, Okla. 74036

[21] Appl. No.: 329,190

[22] Filed: Dec. 10, 1981

Related U.S. Application Data

[63] Continuation of Ser. No. 218,651, Dec. 22, 1980, abandoned, which is a continuation of Ser. No. 968,075, Dec. 11, 1978, abandoned.

[51] Int. Cl.³ .............................................. B60D 1/06
[52] U.S. Cl. ................................ 280/415 A; 280/500; 280/511
[58] Field of Search ............... 280/415 A, 415 R, 500, 280/511

[56] References Cited

U.S. PATENT DOCUMENTS

| | | | |
|---|---|---|---|
| 2,872,213 | 2/1959 | Hosford | 280/511 |
| 2,911,233 | 11/1959 | Riddle | 280/511 |
| 3,801,134 | 4/1974 | Dees | 280/415 A |
| 3,843,160 | 10/1974 | Frushour et al. | 280/415 A |
| 3,922,006 | 11/1975 | Borges | 280/415 A |
| 4,022,490 | 5/1977 | Rocksvold | 280/500 |

Primary Examiner—Joseph F. Peters, Jr.
Assistant Examiner—Donn McGiehan

[57] ABSTRACT

A multiple connection trailer hitch comprising a plate member rotatably secured to a safety bumper of a vehicle and having at least two connection members of varying diametric sizes secured thereto. In one position of the plate with respect to the bumper, one of the connection members is disposed in position for receiving the connection member of a trailer thereon, and in another position of the plate with respect to the bumper, another connection member is disposed in position for receiving the connection member of the trailer. The plate is connected with the bumper by a sleeve and bolt arrangement whereby a locking pin, only, need be removed for permitting rotation of the plate to the desired position, thus eliminating a complete removal of the hitch securing members during adjustment of the hitch for repositioning of the desired connection member thereof.

7 Claims, 9 Drawing Figures

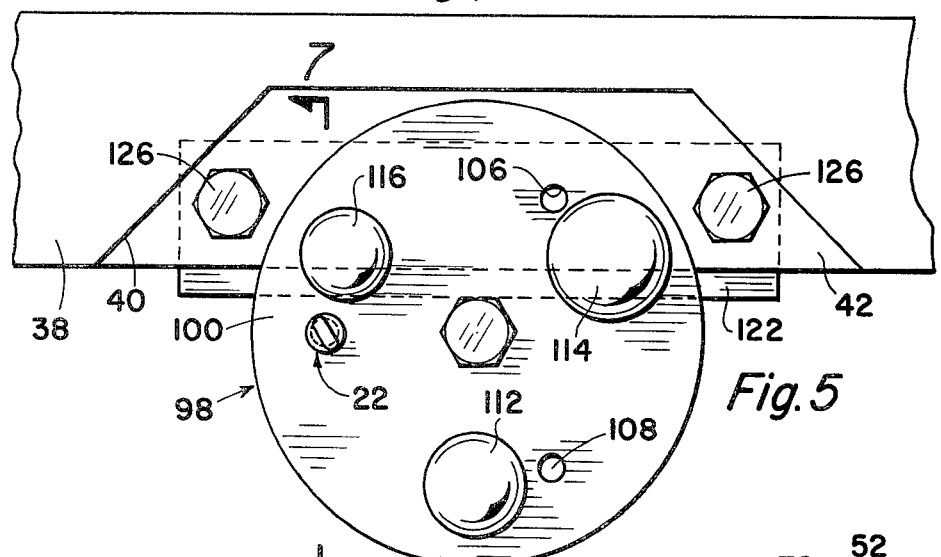
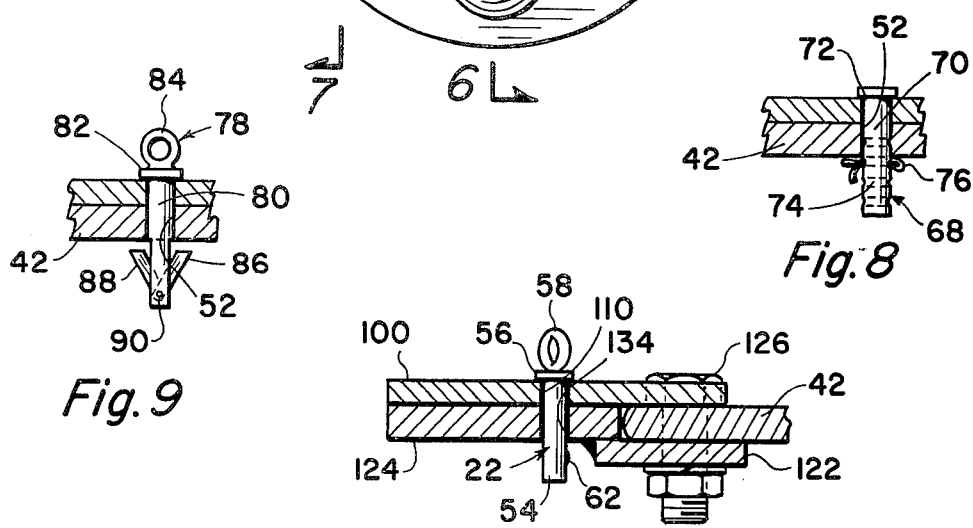
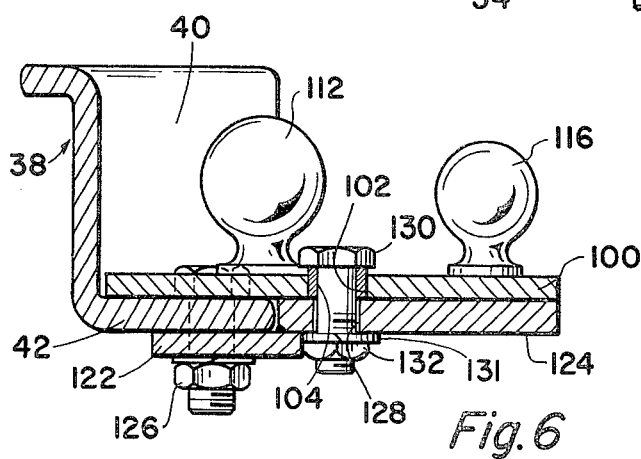

MULTIPLE CONNECTION TRAILER HITCH

This is a continuation application of Ser. No. 218,651, filed Dec. 22, 1980; now abandoned which was a continuation of application Ser. No. 968,075, filed Dec. 11, 1978 now abandoned.

BACKGROUND OF THE INVENTION

1. Field of the Invention

This invention relates to improvements in trailer hitches and more particularly, but not by way of limitation, to a multiple connection trailer hitch.

2. Description of the Prior Art

The use of a vehicle, such as a pick-up truck or the like, for towing a trailer is in widespread use today, particularly with the increased interest in camp trailers, mobile homes, and the like. Many persons operate these towing vehicles with a variety of different towed vehicles, and each towed vehicle may be provided with a different size connection member. As a consequence, the usual trailer ball hitch available today for being secured to a towing vehicle must normally be removed from the vehicle and replaced with another hitch in order to accommodate the different or varying connector sizes of the towed vehicles. In order to overcome this disadvantage, trailer hitches have been developed wherein the hitch is provided with a plurality of connection ball members, each connection member being of a different size. The hitch may be manipulated for positioning the proper size connection member for receiving the connecting element of the towed vehicle, thus eliminating the need for maintaining a plurality of complete hitch devices. Many of these adjustable type hitches comprise channel members having an independent connection element secured to each side thereof, and the channel member must be rotated about its longitudinal axis for altering the position of the connection members as required for use with the particular vehicle to be towed. A cluster-type hitch is shown in the H. V. Riddle U.S. Pat. No. 2,911,233, issued Nov. 3, 1959, and entitled "Cluster Trailer Hitch". This device comprises a plate carried by an upstanding sleeve aand having a plurality of variable sized ball connectors carried on the outer face thereof. This structure has disadvantages in that there are many weak points in the construction, such as at the juncture between the upstanding sleeve and the brackets securing the device to a vehicle, and the relatively great loads or stresses placed on a hitch of this type causes a failure of the device at these weak points whereupon the hitch "collapses" and fails to function properly.

SUMMARY OF THE INVENTION

The present invention contemplates a multiple connection trailer hitch particularly designed and constructed for overcoming the foregoing disadvantages. The novel hitch comprises a main plate having a central aperture provided therein for receiving a bushing or sleeve therethrough. A bolt extends through the sleeve and through the bumper of the towing vehicle, or the like, and is securely retained in position by a suitable lock washer and lock nut. In addition, a locking pin extends through the plate and bumper in spaced relation with respect to the securing bolt and cooperate therewith for securely retaining the plate against rotation about the sleeve or bushing. A plurality of connection members of varying diametric sizes are rigidly secured to the outer face of the main plate and extend outwardly therefrom for the usual connection with the connecting elements of the trailer, or the like, to be towed. When a different size connector member is required for connecting the towing vehicle with the towed vehicle, the locking pin may be easily manually removed in any suitable manner from the locking position thereof. The plate may then be readily rotated about the axis of the sleeve for positioning another of the connector members to receive the connecting element of the trailer to be towed thereby. The locking pin may once again be positioned in the locking position for securing the plate in the new position. The novel multiple connector hitch is simple and efficient in operation and economical and durable in construction.

BRIEF DESCRIPTION OF THE DRAWINGS

FIG. 5 is a plan view of the modified multiple connector trailer hitch shown in FIG. 2.

FIG. 6 is a view taken on line 6—6 of FIG. 5.

FIG. 7 is a view taken on line 7—7 of FIG. 5.

FIG. 8 is a sectional view of a modified locking pin as may be utilized in the invention.

FIG. 9 is a view similar to FIG. 8 showing still another locking pin as may be utilized in the invention.

DESCRIPTION OF THE PREFERRED EMBODIMENT

Figure 1:
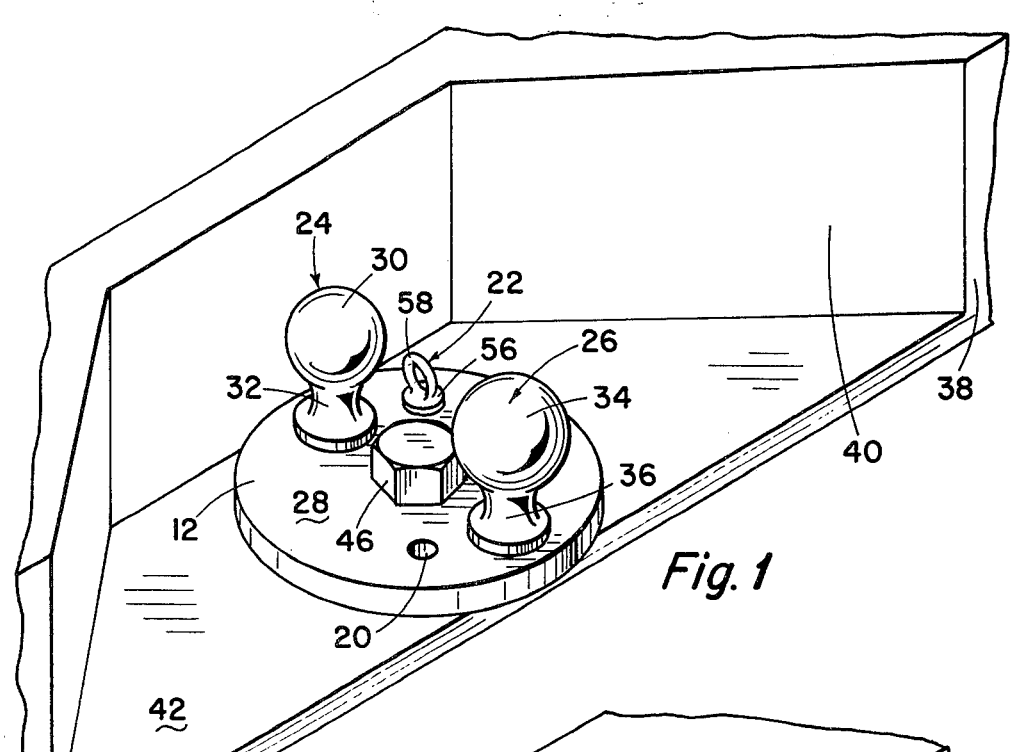
FIG. 1 is a perspective view of a multiple connector trailer hitch embodying the invention as installed on a vehicle bumper.
Figure 3:
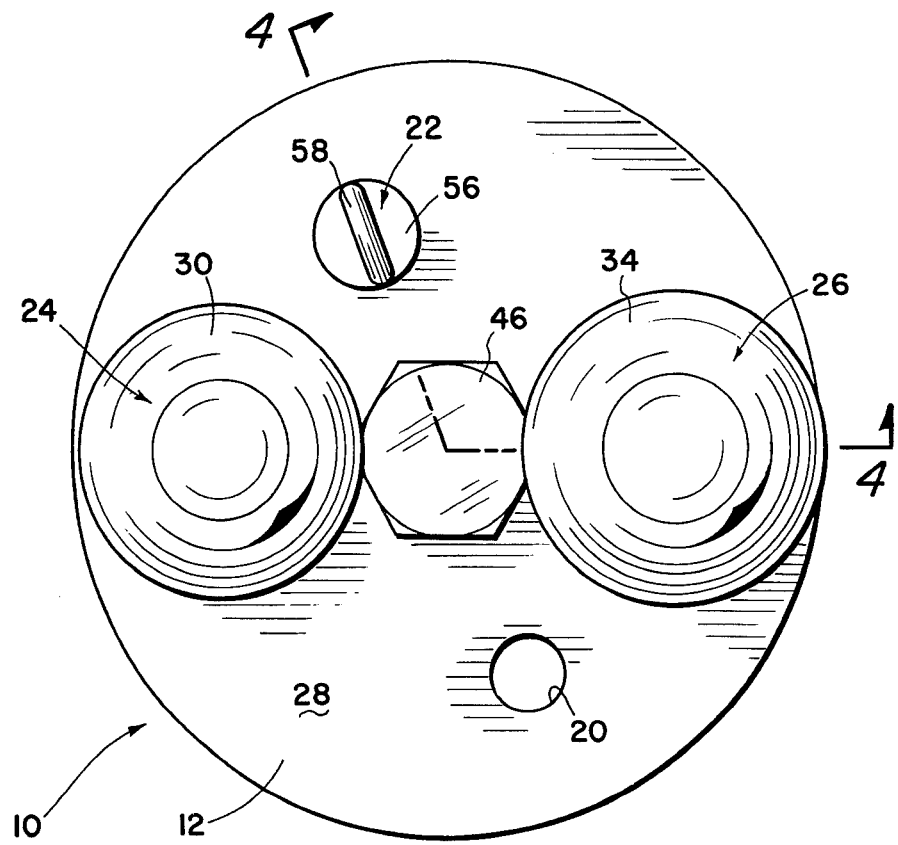
FIG. 3 is a plan view of the multiple connector trailer hitch shown in FIG. 1.
Figure 4:
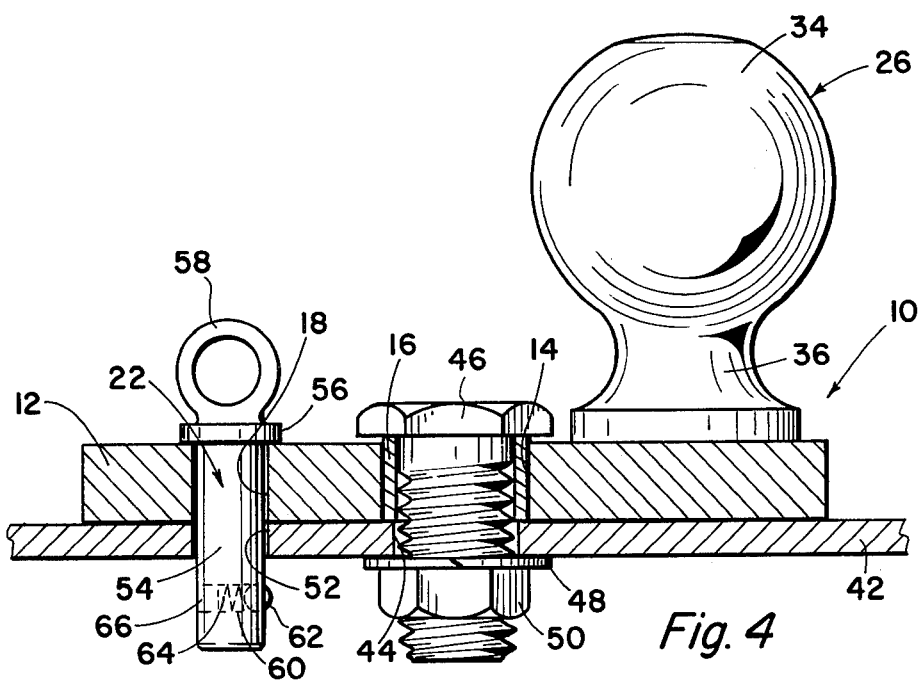
FIG. 4 is a sectional view taken on line 4—4 of FIG. 3, with portions shown in elevation for purposes of illustration.

Referring to the drawings in detail, and particularly FIGS. 1, 3 and 4, reference numeral 10 generally indicates a multiple connection hitch apparatus comprising a support plate 12 having a central bore 14 extending therethrough for receiving a bushing or sleeve 16 therein. The plate 12 is preferably of a circular configuration as shown in the drawings, but not limited thereto, and is provided with a pair of diametrically opposed bores 18 and 20 spaced radially outwardly from the central bore 14. A suitable locking pin generally indicated at 22 selectively cooperates with one of the bores 18 or 20 for facilitating retaining of the plate 12 in position during use of the apparatus 10 as will be hereinafter set forth in detail. A pair of suitable diametrically spaced hitch connection members 24 and 26 are rigidly secured to one surface 28 of the plate 12 and extended axially outwardly therefrom. Whereas the connection members 24 and 26 shown herein are of the ball type, it will be apparent that any suitable connection members may be utilized. The connection member 24 as shown herein comprises a substantially spherical element 30 having a reduced neck portion 32 which is welded, or otherwise rigidly secured to the face 28 of the plate 12. The connection member 26 as shown herein is generally similar and comprises a substantially spherical element 34 provided with a reduced neck portion 36 which is welded or otherwise rigidly secured to the face 28 of the plate 12. The spherical elements 30 and 34 are of different diametric sizes, and are preferably of the two most common connector sizes required for use with the usual trailer, or the like (not shown) being towed today. It will be apparent that the connector members may be integral with the plate 12, if desired.

The hitch 10 is particularly designed and constructed for use with the usual safety bumper 38 normally provided on a pick-up truck or the like (not shown). The bumper 38 is usually provided with a recess 40 having a substantially horizontally disposed bottom plate 42 particularly provided on the bumper for receiving a trailer hitch, or the like, thereon. The bumper plate 42 is normally provided with a bore 44 (FIG. 4) for facilitate mounting the hitch on the bumper.

In use, the plate 12 is positioned in the recess 40 and on the plate 42 in such a manner that the central bore 14 is in substantial alignment with the existing bore 44 of the plate 42. A suitable shoulder bolt 46 is then inserted through the bushing 16 and bore 44 in order to align the plate 12 with the bore 44. The plate 12 may then be manually rotated in such a manner as to position the ball members 30 and 34 one behind the other, as shown in FIG. 1. When the plate 12 has been properly positioned, a suitable lock washer 48 and nut 50 may be disposed over the outer end of the bolt 46 and tightened against the outer surface of the bumper plate 42 for securely retaining the plate 12 in the operational position. A bore 52 may then be drilled through the bumper plate 42 in alignment with the bore 18 or 20 which is disposed in the closest proximity of the vehicle (not shown) itself. The lock pin 22 may then be inserted through the aligned bores 18 and 52 for cooperating with the bolt 46 for securely retaining the plate 12 in the selected operating position. This will position one of the connection elements, such as the element 26, in the proper position for connection with the trailer (not shown) or other vehicle to be towed through the use of the hitch 10.

When it is desired to adjust the position of the plate 12 for placing the other connection element, such as the element 24, in the proper position for connection with the towed vehicle, the lock pin 22 may be removed from the aligned bores 18 and 52 for releasing the locking engagement between the plate 12 and bumper plate 42. The plate 12 may then be easily manually rotated through approximately 180° for reversing the position of the connection elements 24 and 26 and placing the element 24 in the connection position. When the plate 12 has been properly adjusted, the bore 20 will be in substantial alignment with the bore 52, and the locking pin 18 may be inserted therethrough.

Of course, the locking pin may be of any suitable type, and as shown in FIGS. 1, 3, 4 and 7, comprise a shank member 54 having an outwardly extending circumferential flange 56 in the proximity of one end thereof for engagement with the face 28 of the plate 12 in order to limit the depth of insertion of the pin in the aligned bores. A suitable eye member 58 is preferably provided outboard of the flange 56 for facilitating withdrawal of the pin from the bores, as is well known. In addition, a transversely extending passageway 60 is provided in the shank 54 spaced slightly inwardly from the outer end thereof for loosely receiving a ball member 62 therein. A suitable helical spring 64 is disposed within the bore 60 behind the ball 62. The spring 64 may be retained in position by a suitable plug member 66 and constantly urges the ball member 62 in a radially outwardly direction from the shank 54 as clearly shown in FIG. 4. When the locking pin 22 is inserted within the aligned bores 18 and 54, the ball 62 will be depressed against the force of the spring for permitting the entry of the shank 54 into the bores. However, as soon as the passageway 60 is beyond the outer face of the bumper plate 42, the spring 64 will again urge the ball 62 radially outwardly for substantially precluding accidental withdrawal of the pin 22 from the bores 18 and 54. Of course, when the pin 22 is to be purposefully withdrawn, a slight manual pressure against the ball 62 will depress the ball to a position within the bore 60, and the pin 22 may be readily removed in order to permit readjustment of the plate 12 as hereinbefore set forth.

A modified locking pin 68 is shown in FIG. 8 and comprises a shank 70 having a head member 72 provided at one end thereof for limiting the depth of insertion of the pin 68. A plurality of longitudinally spaced diametrically extending bores or passageways 74 are provided in the shank 70 for removably receiving a suitable cotter pin 76, or the like, therethrough in the well known or usual manner. When the pin 68 has been inserted through the aligned bores, the cotter pin 76 may be inserted through the passageway or bore 74 which is in the closest proximity of the outer surface of the bumper plate 42. When the pin 68 is to be withdrawn or removed from the bores, the cotter pin 76 may be withdrawn from the passageway 74.

Still another modified locking pin 78 is shown in FIG. 9 which comprises a shank member 80 having an outwardly extending circumferential flange 82 and eye member 85 similar to the flange 56 and eye 58 provided at one end thereof. The shank 80 is bifurcated at the outer end thereof and a pair of latch members 86 and 88 are pivotally secured within the bifurcated portion at a common point 90. The latch members are so arranged whereby gravity causes them to fall to a normal angularly outwardly extending position as shown in FIG. 9, and suitable means is provided (not shown) for limiting the outward movement of the latches 86 and 88 whereby the upper ends thereof will be spaced slightly from the outer periphery of the bifurcated portion of the shank 80. When the pin is inserted through the aligned bores, the engagement of the bores with the latches will cause the latches to pivot inwardly and preclude interference with the positioning of the locking pin therein. However, as soon as the latches are moved to a position away from the outer surface of the bumper plate 42, the latches will fall to their normal outwardly extending position for precluding accidental withdrawal of the locking pin. When the locking pin 78 is to be removed from the bores, the latches may be manually pivoted in directions toward each other for permitting the withdrawal of the pin from the aligned bores.

Figure 2:
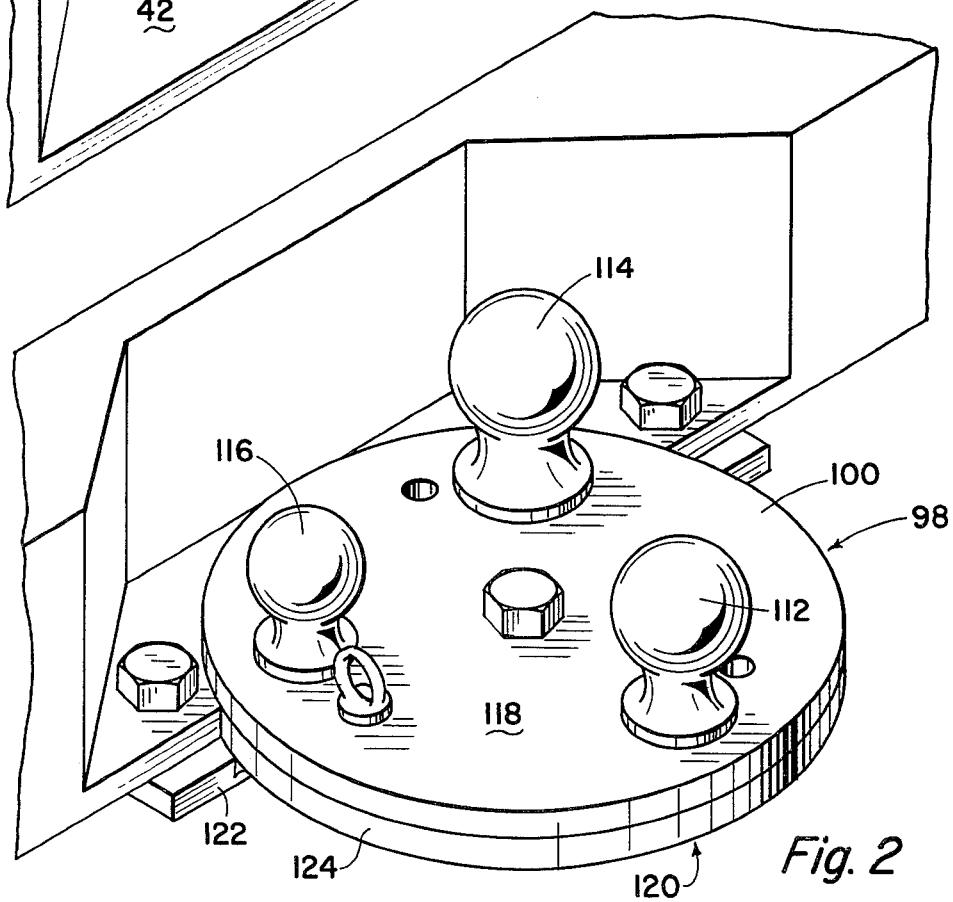
FIG. 2 is a perspective view of a modified multiple connector trailer hitch embodying the invention and installed on a vehicle bumper.

Referring now to FIGS. 2, 5 and 6, a modified multiple connector trailer hitch is generally indicated at 98 and comprises a plate member 100 generally similar to the plate 12. The plate 100 is provided with a central bore 102 for receiving a bushing or sleeve 104 therethrough, and three off-set bores 106, 108 and 110 for the same general purpose as the bores 18 and 20. Three connector members 112, 114 and 116 are welded or otherwise rigidly secured to the outer face 118 of the plate 100 and extend axially outwardly therefrom in the same manner and for the same purpose as the ball connectors 24 and 26. The diameter of each of the ball connectors 112, 114 and 116 is different in order to accommodate different size connector elements provided on the vehicle to be towed (not shown) as hereinbefore set forth.

Since the plate 100 is provided with three connector elements therein in lieu of the two elements provided on the plate 12, it will be apparent that the physical size of the plate 100 must be greater than the physical size of the plate 12. As a result, the bumper plate 42 may not be sufficiently wide to accomodate or totally receive the plate 110 thereon. Accordingly, an adaptor 120 is provided which comprises an elongated plate or strap member 122 having an arcuate plate member 124 welded or otherwise rigidly secured along one edge thereof and extending outwardly therefrom. The plate 122 may be removably secured to the bumper plate 42 in any suitable manner, such as by a plurality of bolts 126, thus securing the adapter 120 to the bumper 38. It is to be noted that the plane of the upper face of the strap 122 is disposed in parallel and off-set relation to the plane of the upper face of the plate 124. In this manner, the upper face of the plate 124 will be disposed in substantial planar alignment with the upper surface of the bumper plate 42 when the strap 122 is secured thereto. The plate 100 may thus be disposed against the upper surfaces of the plates 42 and 124 as clearly shown in the drawings. The plate 124 is provided with an aperture 128 in alignment with the aperture 102 for receiving the bushing 104 therethrough, and a suitable bolt 130 extends through the bushing 104 in the same manner and for the same purpose as the bolt 46. A washer 131 and nut 132, or the like, is secured to the outer end of the bolt 130 for selectively clamping the plate 100 to the plate 124 as is well known. In addition, the plate 124 is provided with an aperture 134 positioned for alignment with a selected one of the bores 106, 110 during use of the hitch 98.

In use, the apparatus 98 is secured to the bumper 38 by providing a pair of spaced bores in the bumper plate 42 in substantial alignment with the complementary bores in the plate 122 for receiving the bolts 126 therethrough in order to securely clamp the apparatus 98 to the bumper. The plate 100 is adjusted in its position for placing the desired connector member 112, 114 or 116 in the rearwardly extending position for connection with the towed vehicle, and the locking pin 22 may be inserted through the bore 134 and the bore of the plate 100 which is aligned therewith. Of course, when a different size connector element is desired, the locking pin may be removed for permitting relocating of the position of the plate 100 in order to position the desired size connector at the rearward location for connection with the vehicle to be towed, subsequent to which the locking pin may be reinserted in its locking position.

From the foregoing it will be apparent that the present invention provides a novel multiple connector trailer hitch having a rotatable support plate secured to the bumper of the towing vehicle, and having a plurality of connection members carried thereby of differing sizes, with the sizes thereof being selected in accordance with the most widely used connector sizes utilized on vehicles to be towed. A central pivot connection is provided for the support plate whereby the plate may be easily and quickly orientated between variable angular positions without a complete disassembly of any part of the hitch assembly. The apparatus is of a rugged, compact assembly designed for strength during utilization thereof, and the operation permits a quick change of the position of the connectors for facilitating a change between towed vehicles.

Whereas the present invention has been described in particular relation to the drawings attached hereto, it should be understood that other and further modifications, apart from those shown or suggested herein may be made within the spirit and scope of this invention.

What is claimed:

1. A multiple connection trailer hitch for a vehicle bumper and comprising a main unitary support plate means, a plurality of spaced ball-type connector members rigidly secured to the support plate means and movable simultaneously therewith, pivot means for pivotally securing the plate means to the bumper, locking pin means cooperating between the support plate means and bumper for securing the plate means in a preselected orientation with respect to the bumper whereby a selected one of the ball-type connector members may be utilized for the connection operation, the pivot means comprising a substantially centrally disposed bore provided in the support plate means for alignment with a complementary bore provided in the bumper, bushing means disposed in said first mentioned bore, and locking bolt means extending through the bushing means and second mentioned bore for receiving lock nut and lock washer means on the outer end thereof for alternately locking the support plate means in a preselected orientation with respect to the bumper and releasing the support plate means for manual angular adjustment to a new orientation with respect to the bumper, and the locking pin means comprises a plurality of spaced bores provided directly in the support plate means, an individual bore provided in the bumper means for selective alignment with any one of the plurality of spaced bore, and a locking pin removably insertable through any aligned bores for cooperating with the pivot means to secure the support plate means to the bumper.

2. A multiple connection trailer hitch as set forth in claim 1 wherein the locking pin comprises shank means insertable through said aligned bores, stop means provided on one end of the shank for limiting the depth of insertion, and movable latch means provided in the proximity of the opposite end of the shank means for retaining the locking pin means in the inserted position within the aligned bores.

3. A multiple connection trailer hitch as set forth in claim 2 wherein the movable latch means comprises spring urged ball detent means carried by the shank.

4. A multiple connection trailer hitch as set forth in claim 2 wherein the movable latch means comprises pivotal latch members movable between latched and unlatched positions.

5. A multiple connection trailer hitch as set forth in claim 2 wherein the movable latch means comprises diametrically extending passageway means provided in the shank, and cotter pin means cooperating with the diametrically extending passageway means for securing the locking pin in the inserted position within the aligned bores.

6. A multiple connection trailer as set forth in claim 1 including adaptor plate means interposed between the support plate means and bumper for securing the support plate means thereto.

7. A multiple connection trailer as set forth in claim 6 wherein the adaptor plate means comprises elongated strap means secured to the bumper, and second plate means secured to the strap means for receiving the support plate means thereon, the plane of the upper surface of the second plate means is off-set with respect to the plane of the strap means whereby the upper plane of the bumper and the upper plane of the second plate means are disposed in substantially planar alignment for receiving the support plate means thereon.

* * * * *